United States Patent
Noxon et al.

(10) Patent No.: US 9,998,581 B1
(45) Date of Patent: Jun. 12, 2018

(54) COMMUNICATION SYSTEM AND METHOD OF COMMUNICATION IN AN ELEVATOR OPERATING ENVIRONMENT

(71) Applicant: Otis Elevator Company, Farmington, CT (US)

(72) Inventors: James Eugene Noxon, Rochester, MN (US); Erik Wayne Jefferson, DeForest, WI (US); Lashia Michael Yang, Fitchburg, WI (US); William Carl Karduck, Inver Grove Heights, MN (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days. days.

(21) Appl. No.: 15/406,303

(22) Filed: Jan. 13, 2017

(51) Int. Cl.
 *H04B 7/00* (2006.01)
 *H04M 1/725* (2006.01)
 *H04W 4/00* (2018.01)

(52) U.S. Cl.
 CPC ......... *H04M 1/7253* (2013.01); *H04W 4/008* (2013.01)

(58) Field of Classification Search
 CPC .............................. H04M 1/7253; H04W 4/008
 USPC ................................................ 455/41.1, 41.2
 See application file for complete search history.

(56) References Cited

U.S. PATENT DOCUMENTS

| | | | |
|---|---|---|---|
| 6,868,945 B2 | 3/2005 | Schuster et al. | |
| 6,986,408 B2 | 1/2006 | Takeuchi | |
| 7,377,364 B2 | 5/2008 | Tyni et al. | |
| 7,664,464 B2 | 2/2010 | Gerstenkorn | |
| 8,047,333 B2 | 11/2011 | Finschi | |
| 8,151,942 B2 | 4/2012 | Rusanen et al. | |
| 8,401,472 B2 | 3/2013 | Gerstenkorn | |
| 8,485,317 B2 | 7/2013 | Gerstenkorn et al. | |
| 8,655,337 B2 | 2/2014 | Sherlock et al. | |
| 8,744,754 B2 | 6/2014 | Kappeler et al. | |
| 8,817,761 B2 | 8/2014 | Gruberman et al. | |
| 8,820,486 B2 | 9/2014 | Gerstenkorn et al. | |
| 8,886,118 B2 | 11/2014 | Reuss et al. | |

(Continued)

FOREIGN PATENT DOCUMENTS

| | | |
|---|---|---|
| AU | 2001234912 B2 | 8/2001 |
| CN | 102674091 A | 9/2012 |

(Continued)

OTHER PUBLICATIONS

"Bluetooth Low Energy Basics," Author: Laura; mbientlab; Dec. 4, 2014; 7 pgs.; retrieved from the internet Feb. 8, 2017; http://projects.mbientlab.com/bluetooth-low-energy-basics/.

(Continued)

*Primary Examiner* — Ayodeji Ayotunde
(74) *Attorney, Agent, or Firm* — Cantor Colburn LLP

(57) ABSTRACT

A method of communication in an elevator operating environment is provided. The method includes generating a Bluetooth low energy (BLE) distinguishable signal with a wireless signal generating device located in at least one location proximate to an elevator boarding area. The method also includes receiving the BLE signal with a mobile device when the mobile device is proximate to the wireless signal generating device. The method further includes initiating an elevator call with the mobile device. The method yet further includes initiating the mobile device to enter a connection mode with a BLE access point device.

16 Claims, 3 Drawing Sheets

(56) References Cited

U.S. PATENT DOCUMENTS

| | | |
|---|---|---|
| 9,008,917 B2 | 4/2015 | Gautama et al. |
| 9,087,246 B1 | 7/2015 | Chin et al. |
| 9,107,152 B1 | 8/2015 | Wurster |
| 9,326,239 B2 | 4/2016 | Polo et al. |
| 9,338,635 B2 | 5/2016 | Palin et al. |
| 9,408,060 B2 | 8/2016 | Helms et al. |
| 9,445,220 B2 | 9/2016 | Granbery |
| 9,467,222 B1 | 10/2016 | Pollmann et al. |
| 9,483,887 B1 | 11/2016 | Solemani |
| 2007/0041352 A1 | 2/2007 | Frankel et al. |
| 2011/0200023 A1* | 8/2011 | Murray ............... G01S 5/02 370/338 |
| 2012/0003983 A1 | 1/2012 | Sherlock et al. |
| 2012/0048655 A1 | 3/2012 | Hsu |
| 2014/0018002 A1 | 1/2014 | Jinesh et al. |
| 2014/0188348 A1 | 6/2014 | Gautama et al. |
| 2014/0188733 A1 | 7/2014 | Granberry |
| 2015/0204678 A1 | 7/2015 | Schuster |
| 2016/0007181 A1 | 1/2016 | Palin et al. |
| 2016/0055692 A1 | 2/2016 | Trani |
| 2016/0090270 A1 | 3/2016 | Wang |
| 2016/0100311 A1 | 4/2016 | Kumar |
| 2016/0127516 A1 | 5/2016 | Chazot et al. |
| 2016/0128049 A1 | 5/2016 | Phillips-Lubimiv et al. |
| 2016/0183077 A1 | 6/2016 | Wang et al. |
| 2016/0248782 A1* | 8/2016 | Troesch ............. G07C 9/00007 |
| 2016/0251199 A1* | 9/2016 | Kronkvist ............... B66B 1/468 187/381 |
| 2016/0278016 A1 | 9/2016 | Wang et al. |
| 2016/0278137 A1 | 9/2016 | Oguchi |
| 2016/0284147 A1 | 9/2016 | Trani |
| 2016/0321702 A1 | 11/2016 | Lerman et al. |
| 2016/0337787 A1 | 11/2016 | Palin et al. |

FOREIGN PATENT DOCUMENTS

| | | |
|---|---|---|
| CN | 203134099 U | 8/2013 |
| EP | 3043575 A1 | 7/2016 |
| EP | 3073704 A1 | 9/2016 |
| WO | 02066357 A1 | 8/2002 |
| WO | 02066358 A1 | 8/2002 |
| WO | 2014178790 A1 | 11/2014 |
| WO | 2016100293 A1 | 6/2016 |

OTHER PUBLICATIONS

"IBeacon Mode on the Metawear," Author: Laura; mbientlab; Dec. 4, 2014; 7 pgs.; retrieved from the Internet Feb. 8, 2017; http://projects.mbientlab.com/beacon-mode-on-the-metawear/.

Bluetooth low energy; "Can a peripheral can be connected to multiple centrals"; retrieved from the Internet Feb. 8, 2017; http://stackoverflow.com/questions/29552626/can-a-peripheral-can-be-connected-to-multiple-centrals; 2 pgs.

* cited by examiner

COMMUNICATION SYSTEM AND METHOD OF COMMUNICATION IN AN ELEVATOR OPERATING ENVIRONMENT

BACKGROUND

Existing elevator systems typically require a user to step into a building lobby and interact with a system kiosk or the like to submit an elevator call (e.g., hall call or destination call). Unfortunately, significant wait times often result due to all patrons using the system kiosk(s).

BRIEF SUMMARY

Disclosed is a method of communication in an elevator operating environment. The method includes generating a Bluetooth low energy (BLE) distinguishable signal with a wireless signal generating device located in at least one location proximate to an elevator boarding area. The method also includes receiving the BLE signal with a mobile device when the mobile device is proximate to the wireless signal generating device. The method further includes initiating an elevator call with the mobile device. The method yet further includes initiating the mobile device to enter a connection mode with a BLE access point device.

Also disclosed is a communication system that includes an operating environment proximate an elevator boarding area. Also included is a wireless signal generating device emitting a Bluetooth low energy (BLE) signal to be received by a mobile device located within the elevator boarding area. Further included is a BLE access point device connected to the mobile device upon detection of advertisement by the mobile device after the mobile device receives an advertisement from the wireless signal generating device, the connection to the BLE access point device to the mobile device to request an elevator assignment from the BLE access point device, the wireless signal generating device being a BLE central communication device when monitoring for signal generating devices that identify an area and becoming a BLE peripheral communication device upon identification of a signal from a recognized signal generating device.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
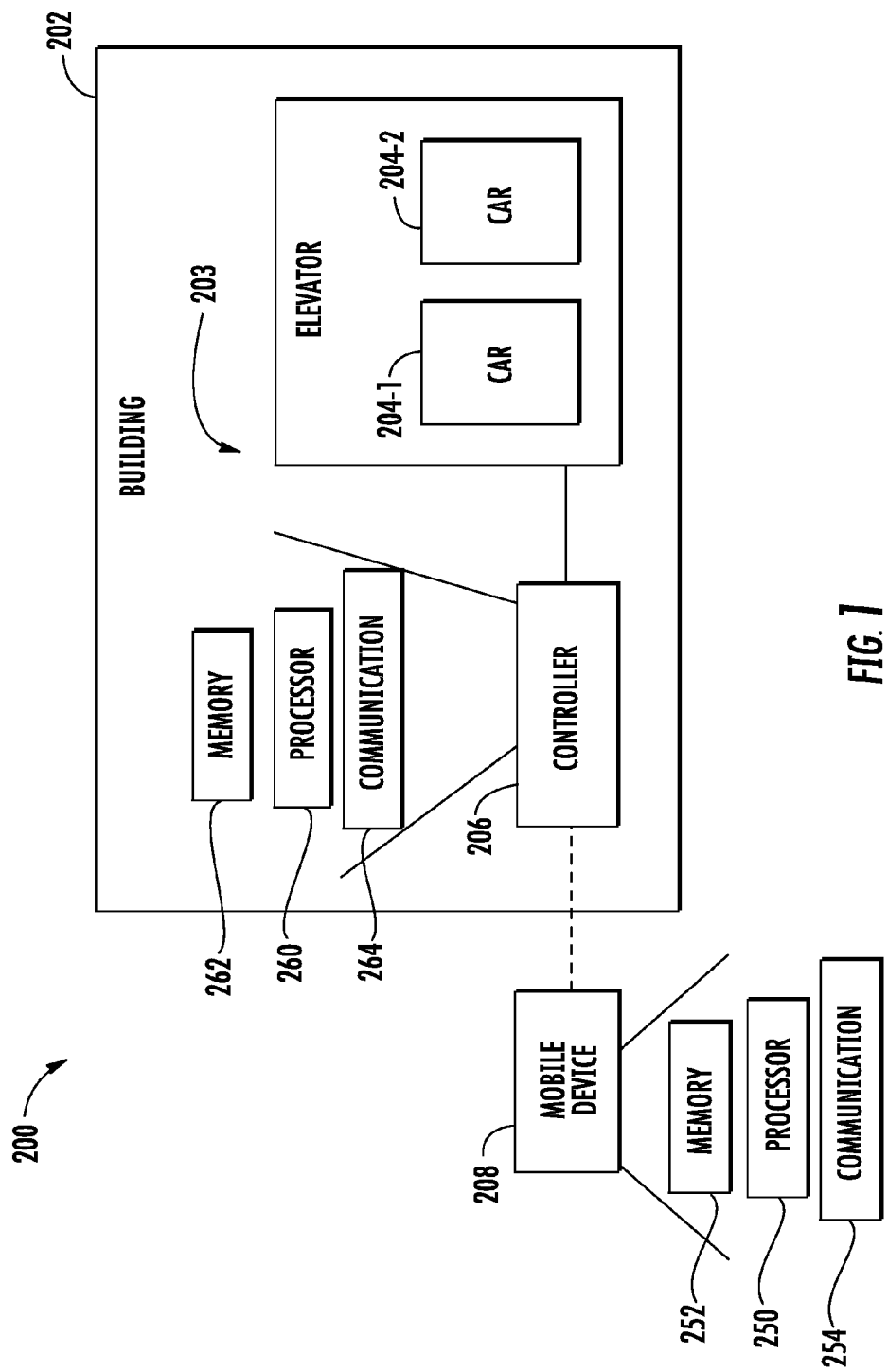
FIG. 1 illustrates an elevator communication system in an example embodiment.

FIG. 1 depicts an elevator communication system 200 in an example embodiment. The elevator communication system 200 includes an elevator system 203 installed at a building 202. In some embodiments, the building 202 may be an office building or a collection of office buildings that may or may not be physically located near each other. The building 202 may include any number of floors. Persons entering the building 202 may enter at a lobby floor, or any other desired floor, and may go to a destination floor via one or more conveyance devices.

The elevator system 203 may include one or more computing devices, such as a controller 206. The controller 206 may be configured to control dispatching operations for one or more elevator cars (e.g., elevator cars 204-1, 204-2) associated with the elevator system 203. It is understood that the elevator system 203 may utilize more than one controller 206, and that each controller may control a group of elevator cars 204-1 and 204-2. Although two elevator cars 204-1 and 204-2 are shown in FIG. 1, it is understood that any number of elevators cars may be used in the elevator system 203. The elevator cars 204-1 and 204-2 may be located in the same hoistway or in different hoistways so as to allow coordination amongst elevator cars 204-1 and 204-2 in different elevator banks serving different floors. It is understood that other components of the elevator system 203 (e.g., drive, counterweight, safeties, etc.) are not depicted for ease of illustration.

Also shown in FIG. 1 is a mobile device 208. The mobile device 208 may include a device that is carried by a person, such as a smart phone, PDA, tablet, etc. The mobile device 208 may include wearable items, such as a smart watch, eyewear, etc. The mobile device 208 may include a processor 250, memory 252 and a communication module 254, as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols, but must support a BLE peripheral role, as described in further detail herein.

The controller 206 may include a processor 260, memory 262 and a communication module 264, as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols, but must support BLE communication in a BLE central role, as described in further detail herein.

Figure 2:
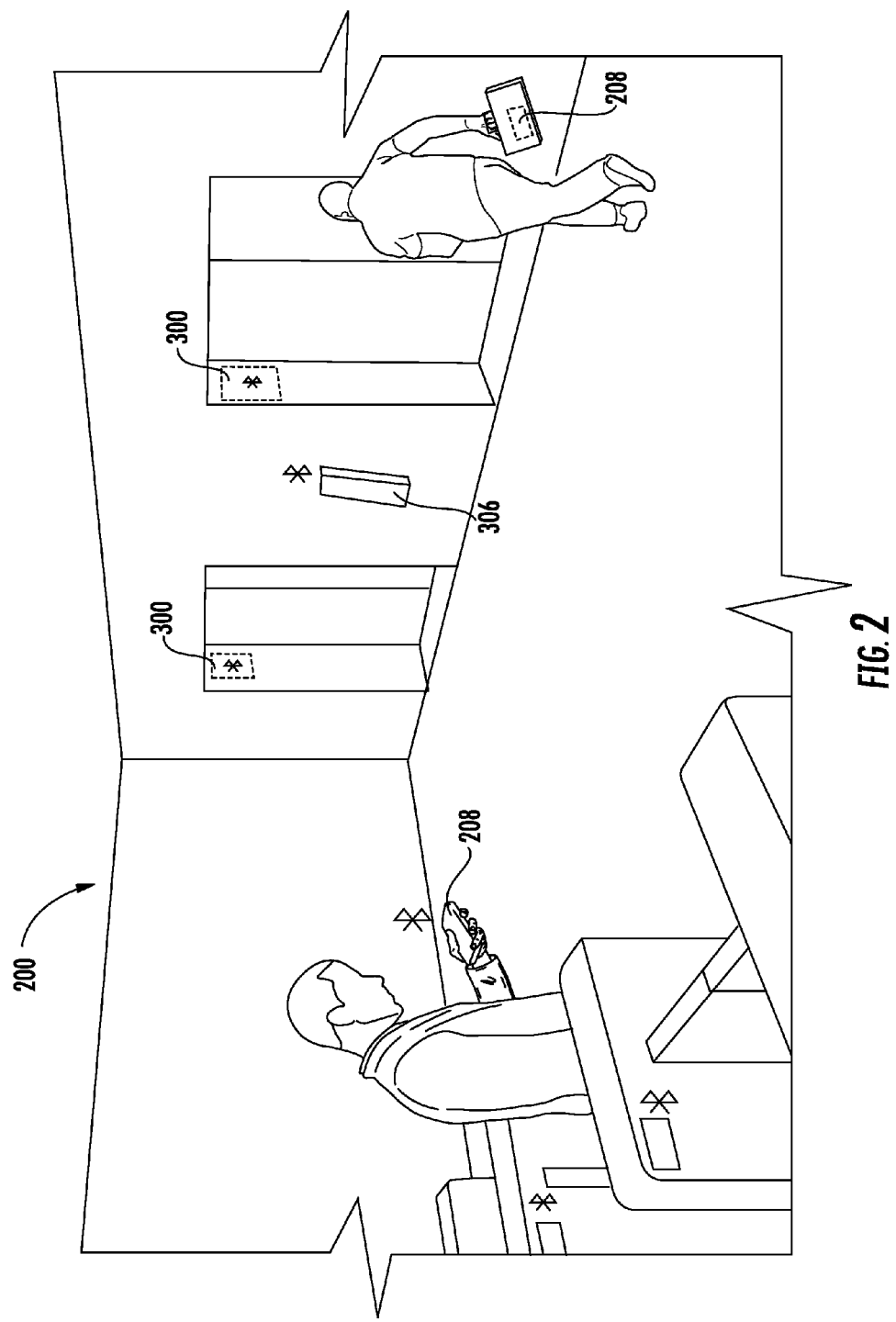
FIG. 2 illustrates a user environment of the elevator communication system.
Figure 3:
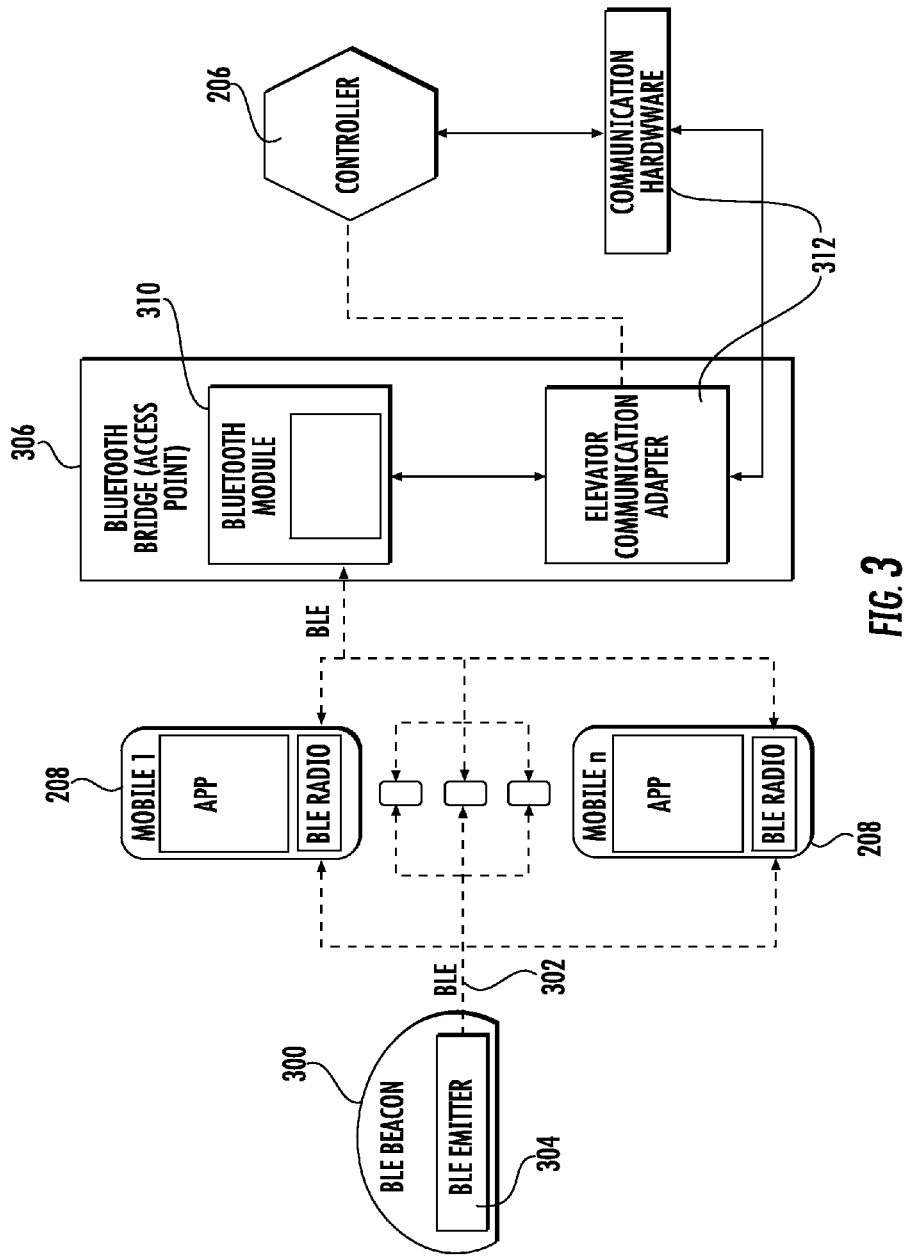
FIG. 3 schematically represents the elevator communication system.

Referring now to FIGS. 2 and 3, an embodiment of the elevator communication system 200 is illustrated according to further aspects of the disclosure. In the illustrated embodiment, the mobile device 208 functions as a BLE peripheral device and one or more devices of the elevator communication system 200 functions as a BLE central device that initiates communication and interaction with the mobile device 208, as will be appreciated from the disclosure herein.

The above-described BLE peripheral device role of the mobile device 208 and the BLE central device(s) role of the elevator communication system 200 are reversed from typical systems. The role reversal of devices in this elevator system is both unique and a fundamental design advantage when deploying such a system in a public environment. If the mobile device 208 were in the central role it would take on the responsibility of managing connection to the system. With the mobile device 208 unable to intercommunicate, and mobile device placement in the lobby being uncontrollable and random, the flow of communication would be chaotic with mobile devices likely all connecting to the same access point device, resulting in unnecessary communication traffic and collisions. In the system 200 disclosed herein, connection and processing of information is made from as many mobile devices as possible, as quickly as possible, via the wireless communication Bluetooth low energy (BLE) with short connection durations for each individual mobile device.

In the illustrated embodiment, at least one, but typically multiple BLE beacon devices 300 (also referred to herein as BLE wireless signal generating devices) are disposed in the system operating environment. Specifically, the BLE beacon devices 300 are located proximate an elevator boarding area. The BLE beacon devices 300 are deployed as separate devices in some embodiments for the purpose of enhancing the ability of the mobile device 208 to detect the presence of the BLE-enabled elevator communication system 200. The BLE beacon devices 300 emit a BLE signal 302 with a BLE emitter 304 that BLE-enabled mobile devices, operating in the usual BLE central mode initially can continuously search for, such as the mobile device 208 described herein, to trigger the mobile device 208 to change their operational mode from BLE central mode to BLE peripheral mode and enter a connection mode with the elevator communication system 200. Upon receipt of the BLE signal 302, the mobile device 208 advertises its presence with an additional BLE signal that is detectable by one or more nearby BLE access point devices 306 that are disposed in the system operating environment. Specifically, the BLE access point devices 306 are located proximate the elevator boarding area. The mobile device can also advertise its presence upon the user opening an application on the mobile device 208, or with the application open the advertising could be set to start only upon the user entering a request within the application on the mobile device 208. The mobile device 208 is connectable to the BLE beacon devices 300 and the BLE access point devices 306 when located proximate the elevator boarding area. In some embodiments, the mobile device 208 is connectable to the components when located within 100 feet, for example. It is to be appreciated that this distance/range is an illustrative range and some embodiments will permit connection with larger or smaller ranges.

One or more BLE access point devices 306 start to connect to the mobile devices advertising with a credential recognizable by the elevator communication system 200, as described herein, with data stored on the phone that is elevator request context data. Only one BLE access point device 306 will complete the connection to the mobile device 208 as the mobile device 208 will indicate that it has connected and prevent other connections from forming. The BLE access point device 306 may also be referred to as a bridge or a suitable alternative. One BLE access point device 306 is capable of handling multiple connections and therefore multiple mobile devices simultaneously. The BLE access point device 306 is part of, or is in operative communication with, the controller 206. It is to be appreciated that the overall system 200 may include a plurality of BLE access point devices 306 spaced from each other to facilitate operation of the system 200 over a desired distance range. In some embodiments, the BLE access point device 306 includes one or more BLE beacon device 300 integrated therein.

The BLE access point device 306 includes a BLE module 310 that receives the BLE signal 302 from the mobile device 208 to establish connection of the mobile device 208 to the BLE access point device 306. Upon connection, the mobile device 208 enters a request for an elevator assignment (i.e., elevator request, elevator call, hall call, destination call, etc.) that is received by the BLE access point device 306. The BLE access point device 306 communicates with the controller 206 in a wired or wireless manner via at least one communication device 312 that is integrated in the BLE access point device 306. A wired and wireless communication arrangement is illustrated for reference, but it is to be appreciated that both are not required in some embodiments. In particular, communication may be established only wirelessly or wired via communication hardware component(s) 312. The controller 206 responds with an elevator assignment for the mobile device 208 user and that assignment is relayed to the mobile device 208 by the BLE access point device 306. After receipt of the assignment, the mobile device 208 is disconnected from the BLE access point device 306. Disconnection may occur automatically by the BLE access point device 306 or may require manual termination by the mobile device 208 user via input on the mobile device 208.

The above-described embodiment of the method provides a single connection (transaction) between the BLE access point device 306 and the mobile device, but it is to be appreciated that the call (e.g., elevator request) and the assignment may be provided over two separate connections. The two connection architecture is advantageous in that the mobile user may be moving while making their elevator request. The first connection may be made through one BLE access point device 306 and they might walk out of range of that first BLE access point device 306 prior to receiving their elevator assignment. In this architecture, after the mobile device 208 enters the request to the original BLE access point device 306 the BLE access point device 306 disconnects from the mobile device 208 and the mobile device starts advertising again with a different signature that it is awaiting an elevator assignment. The elevator communication system 200 sends elevator assignments to all BLE access point devices allowing the second BLE access point device 306 that sees the waiting BLE advertisement to connect to and send the elevator assignment to the waiting mobile device 208.

In operation, the elevator communication system 200 provides users in the operating environment with a seamless and interactive elevator request experience. As shown in FIG. 2, a user simply enters the elevator boarding area with the mobile device 208 and one of the BLE beacon devices 300 triggers the mobile device 208 to enter into a connection mode based on user configuration data previously stored on the mobile device 208. An application on the mobile device 208 stores a list of universal unique identifiers (UUIDs) that are advertised by the BLE beacon device(s) 300. Recognizing one of the advertised UUIDs gives the application context information about the current building and floor. In some embodiments, based off this context and any user preferences stored about desired floor and times of day or days of the week for travel, the application informs the user it will be making a request and then makes a request for the floor on the user's behalf if the response is in the affirmative. In some embodiments, the application detects the floor and building context and makes a preprogramed request. In other words, in some embodiments, the mobile device 208 is pre-commissioned with a digital credential that enables it to communicate with specific BLE access point devices in a specific building. The BLE access point device 306 will communicate over an encrypted BLE channel to the mobile device 208 and authenticate the mobile device 208 based on the credential. The digital credential may also include an access control payload that is communicated along with the elevator request to the BLE access point device 306. The BLE access point device 306 communicates the request and access control payload to the elevator system that verifies with the access control system that the user with the access control payload is authorized to travel to the requested floor. The specific call may be based on a manual input by a user through an interactive application stored on the mobile device 208 in some embodiments. This may be done by physical contact between the user and an interactive surface (e.g., touch screen) of the mobile device 208 or through voice prompt commands. Alternatively, a user may input predetermined settings into the mobile device 208 that represent a floor destination, for example. This is particularly useful for individuals that often utilize the elevator system to travel to a single floor on a regular basis. Upon determination of an elevator assignment by the controller 206, the BLE access point device 306 relays the assignment to the mobile device 208 and it is displayed to the user. The assignment may also be displayed in alternative manners, such as on a watch or a wall display, for example. Traditional elevator systems do not assign users to specific elevators. For this case the message back to the user is a confirmation that their request has been accepted.

Advantageously, the elevator communication system 200 allows a user to step into an elevator boarding area (e.g., lobby) and receive an elevator assignment without interacting with anything other than their mobile device 208 and even then only doing so in a minimalistic fashion. Additionally, backups at system kiosks are reduced, thereby enabling better traffic flow to elevators. Use of the mobile device 208 as a BLE peripheral device, rather than a BLE central device, results in a better flow of communication between the mobile devices and the communication system.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of communication in an elevator operating environment comprising:

generating a Bluetooth low energy (BLE) distinguishable signal with a wireless signal generating device located in at least one location proximate to an elevator boarding area;

receiving the BLE signal with a mobile device when the mobile device is proximate to the wireless signal generating device, the wireless signal generating device supporting a BLE central role for initiating communication with the mobile device, the mobile device supporting a BLE peripheral role in the communication;

initiating an elevator call with the mobile device; and initiating the mobile device to enter a connection mode with a BLE access point device.

2. The method of claim 1, wherein the elevator call is a hall call.

3. The method of claim 1, wherein the elevator call is a destination call.

4. The method of claim 1, wherein the user initiates the elevator call by interacting with the mobile device.

5. The method of claim 1, wherein the user initiates the elevator call by inputting predetermined settings into the mobile device.

6. The method of claim 1, further comprising communicating between the BLE access point device and a controller to determine the elevator assignment.

7. The method of claim 6, wherein the BLE access point device and the controller are in wireless communication.

8. The method of claim 6, wherein the BLE access point device and the controller are in wired communication.

9. The method of claim 1, further comprising advertising and functioning the mobile device as a BLE peripheral device with data stored on the mobile device upon receipt of the signal from the BLE wireless signal generating device.

10. A communication system comprising:

an operating environment proximate an elevator boarding area;

a wireless signal generating device emitting a Bluetooth low energy (BLE) signal to be received by a mobile device located within the elevator boarding area; and a BLE access point device connected to the mobile device upon detection of advertisement by the mobile device after the mobile device receives an advertisement from the wireless signal generating device, the connection to the BLE access point device to the mobile device to request an elevator assignment from the BLE access point device, the wireless signal generating device being a BLE central communication device when monitoring for signal generating devices that identify an area and becoming a BLE peripheral communication device upon identification of a signal from a recognized signal generating device.

11. The communication system of claim 10, further comprising a controller in operative communication with the BLE access point device to determine the elevator assignment to be communicated to the mobile device.

12. The communication system of claim 11, wherein the controller is in wired communication with the BLE access point device.

13. The communication system of claim 11, wherein the controller is in wireless communication with the BLE access point device.

14. The communication system of claim 10, further comprising a plurality of BLE wireless signal generating devices disposed in the operating environment, each device generating a BLE distinguishable wireless signal.

15. The communication system of claim 10, further comprising a plurality of BLE access point devices disposed in the operating environment, each device connectable to the mobile device.

16. The communication system of claim 10, further comprising a plurality of mobile devices in the operating environment, each mobile device connectible to the BLE access point device and capable of detecting the signal from a wireless signal generating device.

* * * * *